Patented Sept. 3, 1940

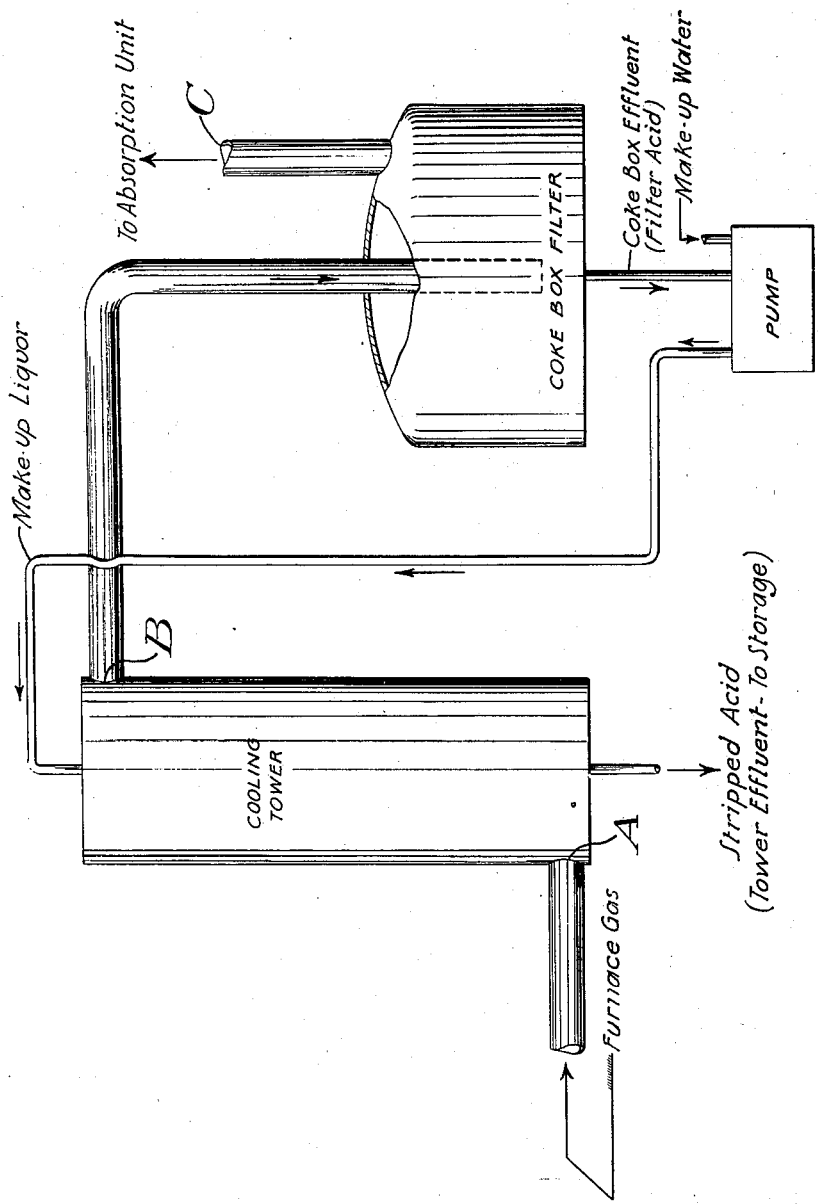

2,213,556

UNITED STATES PATENT OFFICE 2,213,556

MANUFACTURE OF HYDROCHLORIC ACID

Otho L. Thomas, Drexel Hill, Pa., assignor to E. I. du Pont de Nemours & Company, Wilmington, Del., a corporation of Delaware Application January 13, 1938, Serial No. 184,722

5 Claims. (Cl. 23—155)

This invention relates to the manufacture of hydrochloric acid from sulphuric acid wherein furnace gas containing hydrochloric acid is led successively thru cooling and filtering units for the removal of sulphuric acid and other impurities prior to the recovery of the hydrochloric acid content of the furnace gas, and is particularly directed to processes in which cooling of the gas is obtained by the combined effect of radiation and transfer of sensible heat of the gas to heat of vaporization of water under conditions such that loss of hydrochloric acid is minimized.

In the manufacturing of hydrochloric acid from sulphuric acid the sulphuric acid carried over in the furnace gas must be removed prior to absorption. This is customarily accomplished by cooling the furnace gas sufficiently to form sulphuric acid mist which is removed by passing the so cooled furnace gas thru a suitably packed column or filter, such as the conventional coke box filter. As considerable quantity of water is required in the furnace gases for the formation of sulphuric acid mist and for effective filtering considerable hydrochloric acid gas is absorbed in the filter and discharged as a low grade by-product acid so contaminated with sulphuric acid as to be of little value.

There are in general two methods of cooling furnace gases. In the first, S-pipe radiation coolers are employed and in the second furnace gases are cooled in a cooling tower by contact with a cold aqueous cooling medium. Both methods as heretofore practiced have resulted in the production of a large quantity of by-product acids representing material loss of hydrochloric acid. In the first as much as 4 per cent or more of the total hydrochloric acid content of the furnace gas was removed from the system in the filter-acid by-product, while in the second additional quantities of hydrochloric acid were removed from the system in the tower effluent, as much as 15 to 20 per cent of the total hydrochloric acid content of the furnace gas being removed. The second method, however, offers certain advantages in respect to the efficiency of the cooling operation and the ease with which the hydrochloric acid can be recovered from the by-product acid which, notwithstanding higher losses of hydrochloric acid, led to its general adoption in the industry.

This invention relates to improvements in the second method designed to avoid or minimize loss of hydrochloric acid by way of the by-product acid, which improvements to be fully understood need be contrasted with the prior practices and the manner in which they give rise to substantial losses of hydrochloric acid in the by-product acid.

These practices have been to dissipate as much as practical of the sensible heat of the furnace gas by radiation and to dissipate the remaining sensible heat into an external cooling medium, the sensible heat of the furnace gas being considered as the heat available between the temperature of the gas leaving the furnace and that of the gas entering the coke box. Dissipation of sensible heat of the furnace gas into an external cooling medium was effected by a cyclic flow of the cooling medium over the tower and thru external water coolers, and the drop in temperature in the tower thus effected was determined by the capacity of the external coolers and the rate of flow of the cooling medium.

The cooling medium was essentially water containing hydrochloric acid and sulphuric acid adsorbed in the tower, and according to some practices also the sulphuric acid and the hydrochloric acid contained in the filter acid, the latter suitably cooled being introduced into the cooling medium as a convenient means of disposal. As large volumes of the cooling medium were required for obtaining the desired temperature drop in the tower, the tower effluent discharged for recirculation contained a small percentage only of sulphuric acid, usually about 3 to 5 per cent. Consequently the cold cooling medium was capable of absorbing large amounts of hydrochloric acid so that on discharge from the tower its hydrochloric acid content amounted to at least 22 per cent, usually about 30 per cent or more.

In conformity with the purpose of the process, namely, to remove sulphuric acid, it was necessary to by-pass a portion of the tower effluent to storage. Sometimes the filter acid was also discharged to storage for this purpose but, as already pointed out, this practice was undesirable in view of the high sulphuric acid content of the filter acid. Thus a large percentage of the hydrochloric acid was removed from the system as a by-product acid of relatively little value.

I have now found that loss of hydrochloric acid incident to cooling and filtering for the removal of sulphuric acid can be reduced substantially by operating the cooling tower in a manner such that the major portion of the sensible heat of the furnace gas over and above that dissipated by radiation is converted into heat of vaporization of water. This is effected by passing an aqueous medium over the cooling tower at a rate so correlated to the capacity of the tower that the major portion of the water content of the aqueous medium is evaporated within the tower.

Thus, instead of transferring the sensible heat of the furnace gas to sensible heat of the cooling medium and dissipating the latter in external coolers by a cyclic flow of the cooling medium over the tower and thru external water coolers, I effect a direct transfer of the sensible heat of the furnace gas to a supplementary component which by virtue of a change of phase is capable of absorbing heat in amounts entirely disproportionate to the quantity of the component. Consequently I am able to obtain an equivalent drop in temperature within the cooling tower with a materially smaller quantity of cooling medium and a correspondingly diminished rate of flow.

The same principles which operate to reduce the temperature of the furnace gas coupled with the presence of sulphuric acid in the cooling medium, due to the sulphuric acid absorbed from the furnace gas, present in or added to the make-up liquor, operate also to minimize the loss of hydrochloric acid. In passing over and thru the tower in contact with the hot furnace gas, the cooling medium rapidly absorbs hydrochloric acid until equilibrium between hydrochloric acid in the furnace gas and hydrochloric acid in solution in the cooling medium obtains. Simultaneously therewith and subsequent thereto evaporation of water concentrates the cooling medium with respect to sulphuric acid and results in an increase in the temperature of the cooling medium corresponding to the higher boiling point of the more concentrated cooling medium. One equilibrium obtains the amount of hydrochloric acid which may remain in solution, being an inverse function of the sulphuric acid concentration and the temperature, progressively become smaller and smaller since, as the evaporation of water continues, the cooling medium progressively passes thru stages of equilibrium increasingly unfavorable to hydrochloric acid in solution. If the period of contact is sufficiently prolonged by the provision of a tower of proper capacity, the cooling medium will become so concentrated with respect to sulphuric acid that, at the temperature of discharge, no substantial amount of hydrochloric acid will remain dissolved in and be discharged with the tower effluent.

Moreover, the same principles which operate to reduce the temperature of the furnace gas and to minimize loss of hydrochloric acid may be utilized further to reduce the loss of hydrochloric acid to such an extent that no appreciable loss of hydrochloric acid is entailed in any part of the cooling and filtering operations. This may be accomplished by the acccompanying flow sheet wherein filter acid as discharged from the coke box is diluted with water and pumped acyclicly over the tower without intervening cooling other than that attributable to radiation. In this manner the hydrochloric acid content of the filter acid is stripped from the cooling medium and reintroduced into the system so that no appreciable loss of hydrochloric acid from the system is entailed, irrespective of the amount of hydrochloric acid absorbed in the coke box and discharged with the filter acid.

The capability of the tower, when operated as above noted, to strip and reintroduce into the system the hydrochloric acid content of the filter acid is due to the establishment within the tower of the equilibrium conditions already discussed and, moreover, is enhanced by the fact that equilibrium conditions are obtained much more rapidly due to the presence of the hydrochloric acid and sulphuric acid introduced into the cooling medium by the filter acid. In this manner the heat content of the furnace gases, which heretofore has been wasted by discharge into external cooling media, is utilized to strip the hydrochloric acid from the filter acid. In effect, the cooling tower, which heretofore has been operated in such a manner as to absorb hydrochloric acid, is converted into a stripping tower wherein the sensible heat of the furnace gas, as a result of being transferred into heat of vaporization of water, is utilized to reintroduce into the system the hydrochloric acid contained in the filter acid. Thus by operating the cooling tower under such conditions that the major portion of the sensible heat of the furnace gas over and above that dissipated by radiation is converted into heat of vaporization of water, I am able to obtain greater efficiency and higher yields than has been considered possible heretofore.

Other cooling cycles than the transfer of the sensible heat of furnace gas to heat of vaporization of water result in the operation of the cooling tower in the manner described. Aside from the dissipation of heat by radiation, however, these additional cooling cycles do not contribute to any great extent to the temperature drop obtained within the tower. Thus, while heat is abstracted from the furnace gas in stripping hydrochloric acid from the cooling medium and in raising the cooling medium to the boiling point, the quantity of the heat abstracted for these purposes is small as compared with the quantity of heat transferred to the heat of vaporization of water.

Aside from the heat losses due to radiation and the small amount of heat abstracted with the tower effluent the heat transfer within the tower is entirely adiabatic. Inasmuch as the radiation losses are substantially constant for any particular system and inasmuch as the temperature and quantity of the tower effluent are also substantially constant, regulation of the temperature drop within the tower is effected by regulating the adiabatic transfer of heat. This is effected by merely increasing or decreasing the rate of flow of the cooling medium as required to obtain the desired drop in temperature.

It will be apparent, therefore, that the reduction in temperature within the tower is obtained without substantial dissipation of heat other than that attributable thru radiation. Consequently, the temperature of the cooling medium will not affect appreciably the total heat content of the furnace gas passing on to the absorption unit. The provision of external cooling means at this point is accordingly unnecessary and, moreover, it is generally undesirable except under particular conditions which will be pointed out later. While this imposes an additional load on the cooling means of the absorption units, it has the advantage of confining the required cooling for the removal of heat from the system to a single unit, that is, to the absorption unit, so that installation, operation, and maintenance costs are reduced.

It is not to be inferred from the foregoing that dissipation of heat by radiation is immaterial. On the contrary, radiation losses are advantageously maintained as great as practicable in view of the economy afforded by this means of reducing the total heat content of the system.

The processes of this invention are advantageous in this respect as the cooling tower and coke box filter may be operated effectively at higher temperatures so that improved radiation characteristics obtain.

While a certain degree of humidification has been recognized heretofore as essential to effective filtering, it was previously considered necessary to regulate temperature and humidity to keep the amount of hydrochloric acid and filter acid as small as possible. High hydrochloric acid content in the filter acid is not only permissible in this invention but desirable, as will be pointed out later, since it tends to reduce absorption of hydrochloric acid in the top of the cooling tower. Consequently, the conditions of temperature and humidity of the furnace gases may be so regulated as to obtain maximum efficiency in the coke box filter.

Another important advantage of this invention resides in the character and quantity of the by-product acid, that is, the tower effluent. It will be apparent from the criteria already given that this acid is mainly aqueous sulfuric acid and is produced in relatively insignificant amounts. The former results from concentration in the tower which precludes any substantial quantity of hydrochloric acid from remaining therein, and the latter is due to the fact that its sulfuric acid content is dependent upon the amount of sulfuric acid recovered from the furnace gas in the tower and coke box, seldom more than two per cent of the total sulphuric acid consumed in the furnace. Consequently a relatively high percentage content of hydrochloric acid, even as much as 10 per cent, which for optimum conditions is exceptionaly high and rarely encountered in practice, may be tolerated by the by-product without any substantial loss of hydrochloric acid from the system. Actually the hydrochloric acid content rarely exceeds 3 per cent and represents less than 0.10 per cent of the total hydrochloric acid content of the furnace gas. The by-product may be recovered for such uses as may be available, for example, pickling of metals, or returned to the furnace as part of the initial charge of sulfuric acid.

The processes of this invention are also advantageous in that the amounts of other impurities, such as sodium chloride, iron, arsenic, sulfur dioxide, and organic matter, are effectively reduced by cooling and filtering in the manner set forth.

Sulfur dioxide particularly is effectively removed. It appears that a considerable portion of the sulfuric acid removed in the tower effluent originally leaves the furnace as sulfur dioxide apparently due to the reducing effect of organic matter, arsenic, and similar impurities. In the operation of the cooling tower and coke box filter according to this invention the sulfur dioxide in furnace gases is oxidized to sulfur trioxide during the passage of the furnace gases thru the cooling tower and coke box filter. While the mechanism of the reactions involved are not well understood it appears that iron present as an impurity either oxidizes or catalyzes the oxidation of the sulfur dioxide. In any event, the amount of sulfuric acid removed in the tower effluent is greater than can be accounted for by the sulfur trioxide content of the furnace gas.

Arsenic and iron are also removed more completely due partly to more effective filtering and partly to acyclic operation of the cooling tower. Particularly effective removal of these impurities is obtained if the filter acid which is severely contaminated with these impurities is not used in the cooling medium. For example, by discharging the filter acid to storage and passing a high grade dilute sulfuric acid over the cooling tower in the manner described, I have been able to produce commercial acid having an arsenic content in the order of 0.014 part per million with ordinary crudes whereas such low arsenic content has not been obtainable heretofore in the salt cake process, even by the careful selection of crudes.

Thus where a particularly high grade commercial acid is desired it may be expedient to diverge from the preferred process as illustrated in the drawing by discharging the filter acid to storage for stripping in a later operation or in another system and making up cooling liquor from an extraneous source of a high grade sulfuric acid. While this process foregoes one of the major advantages of the invention, namely, the utilization of the capacity of the cooling tower, when operated in the manner set forth, to dispose of the filter acid and to reintroduce its hydrochloric acid content into the system and at the same time to provide effective cooling with a minimum of equipment, handling of materials and supervision, it affords advantages in the reduction of impurities which, under the proper circumstances, may more than offset the diminution in the yield and the increased operating cost. Moreover, these disadvantages may be avoided by operating two plants simultaneously and stripping the filter acid of both plants in the cooling tower of one.

For effective coke box operation it is essential that the furnace gas be cooled to a temperature sufficient to cause the formation of sulfuric acid mist. For this purpose it is generally recognized in the art that the gas entering the coke box should not be at a temperature substantially above 175° F. The amount of temperature drop required in the cooling tower will accordingly depend upon the temperature of the furnace gas entering the tower, hereinafter referred to with respect to the accompanying drawing as the inlet temperature A, and the temperature drop between the tower outlet B and the coke box outlet. Since the latter is fairly constant and in most installations never varies more than a few degrees Fahrenheit, it will be sufficient to regulate the temperature drop in the tower to maintain a predetermined outlet temperature B. This regulation is effected by simply increasing or decreasing the rate at which the cooling medium is introduced into the tower as required to maintain the desired outlet temperature B.

It will be apparent, therefore, that the inlet temperature A largely determines the amount of water that must be evaporated within the tower to obtain the desired outlet temperature B, and is in turn determined by the radiation characteristics of the system between the furnace and the cooling tower. Consequently, for any particular installation the rate of introduction of the cooling medium to the tower need be varied only as the radiation characteristics are affected by changes in meteorological conditions. This, coupled with the fact that the cooling effect of the cooling medium is independent of variations in meteorological conditions, affords a degree of simplicity and economy in regulating the temperature drop not heretofore attainable. The necessity of maintaining a proper balance between the temperature and the rate of flow of the cooling medium over the tower is avoided.

All that is required is to increase or decrease the rate of flow of the cooling medium, as the temperature at A is increased or decreased by changes in meteorological conditions. It will be sufficient, therefore, merely to regulate the rate of flow of the cooling medium to the tower as required to maintain the desired outlet temperature B.

While the processes of this invention are capable of being operated with an inlet temperature A ranging from in the neighborhood of the furnace temperatures as a maximum to in the neighborhood of the temperature of the scrubbing medium as a minimum, it is desirable, as already pointed out, to effect a reduction of the temperature of the furnace gas by radiation as large as practical prior to entry into the cooling tower. Too great a drop in temperature at this point, however, is undesirable in view of the longer time of contact between the cooling medium and the furnace gas required to obtain satisfactory concentration of the cooling medium within the tower. If the inlet temperature A is too low excessively large tower capacity may be required to effect concentration of the cooling medium sufficient to preclude any substantial quantity of hydrochloric acid remaining dissolved therein.

The temperature of the cooling medium entering the tower as already pointed out is a relatively insignificant factor, the only criteria being that it be less than the desired outlet temperature B. Since the temperature of the filter acid and the make-up water, particularly the latter, are inherently much lower than the outlet temperature B, it will not be necessary to consider this temperature at all.

If a relatively low outlet temperature B is desired, however, it is desirable that the cooling medium be relatively cool on entry to the tower in order that the furnace gas leaving the tower may be cooled somewhat by contact with the cooling medium. This is desirable, in view of the fact that evaporation of water and the cooling effect obtained is relatively small in the top of the tower where the cooling medium has not yet reached the optimum rate of stripping and evaporation. While this is materially accelerated by the intimate contact between the cooling medium and furnace gas afforded by the scrubbing action of the tower, it may not be sufficient alone if a specially low outlet temperature B is desired. It may be desirable accordingly in some installations to employ means for cooling the cooling medium prior to its introduction into the tower.

The composition of the cooling medium, tho predetermined and comparatively constant for any particular installation, may be varied widely and may comprise water with or without the addition of sulfuric and hydrochloric acids. It is desirable, however, that the cooling medium as made up contain sulfuric acid for, if reliance is placed solely upon the sulfuric acid absorbed in the tower, the tower concentrate may be insufficient thoroly to wet the packing in the bottom of the tower. For this purpose it is desirable that the tower effluent be of sufficient quantity to prevent any of the packing in the tower from being exposed to the direct action of the hot furnace gases. This affords greater flexibility of operation because the rate of introduction in the cooling medium may be varied as desired without danger of overheating the packing in the bottom of the tower by exposure to the hot furnace gas. Moveover, the presence of sulfuric acid provides more effective cooling in that it reduces the amount of hydrochloric acid which is absorbed in the tower before equilibrium conditions obtain.

As already pointed out, some hydrochloric acid will be absorbed in the top of the tower before equilibrium conditions obtain. Inasmuch as the absorption of hydrochloric acid is strongly exothermic and tends to counteract the cooling effect to the evaporation of water, it may be desirable to reduce the amount of hydrochloric acid absorbed at this point. This may be effected by providing a cooling medium containing both hydrochloric and sulfuric acid. The nearer this mixed acid approaches equilibrium conditions upon introduction into the cooling tower the less the hydrochloric acid which will be absorbed and, consequently, the more complete and efficient the cooling effect obtained.

In the normal operation, as illustrated in the accompanying drawing, I have not found it necessary that the hydrochloric acid and sulfuric acid in the cooling medium be in equilibrium or even near equilibrium as the reduction in temperature obtainable, even with relatively small amounts of these acids in the cooling medium, is more than adequate to insure the formation of sulfuric acid mist. This is of particular advantage as the amount of water added to the filter acid may be varied as required to obtain the desired temperature drop within the tower without any particular reference to the hydrochloric and sulfuric acid content.

Under certain operating conditions, as for example when water is being evaporated at a maximum rate either due to the saturation of the furnace gas or to insufficient tower capacity, the temperature drop obtainable may be limited. Under such conditions a still further reduction in temperature may be obtained by an increase in either the hydrochloric or sulfuric acid content of the cooling medium. Preferably, the hydrochloric acid content is increased so as to avoid any substantial increase in the boiling point of the cooling medium.

It may also be desirable, particularly where additional quantities of impure hydrochloric acid are available from extraneous sources, to increase the hydrochloric acid content of the cooling medium in order more completely to utilize the latent capacity of the cooling tower for stripping hydrochloric acid from the cooling medium. In this manner the processes of this invention may be utilized in disposing of large quantities of unmarketable hydrochloric acid and to increase the hydrochloric acid content of the furnace gases. Such additional impure acid as may be available may be combined with the filter acid and the volume adjusted, if necessary, by the addition of water. As already pointed out filter acid from another plant may be so disposed of in order that the cooling tower of that plant may be economically operated independently of the filter acid produced therein.

In adapting the processes of this invention to existing equipment it may be necessary to adjust the inlet temperature A and the composition of the cooling medium according to the principles already outlined in order to avoid overloading the cooling tower. In other words, the conditions of operation should be adjusted in accordance with the capacity of the cooling tower to concentrate the cooling medium with respect to sulfuric acid to the desired degree. These precautions need be observed, however, only where the capacity of the existing tower is inadequate to provide the proper degree of flexibility of operation.

Thus, where a cooling tower of ample capacity is provided so that, irrespective of the variations in the inlet temperature A and the composition of the cooling medium, the cooling medium will become concentrated in the tower to a required degree, it will be unnecessary to observe any particular restrictions on the operating conditions. With properly designed equipment the processes of this invention are capable of being carried out under widely divergent conditions and, irrespective of these conditions, require little if any attention during operation, it being necessary only to regulate the rate of introducing of the cooling medium to the tower as required to maintain the desired outlet temperature B. Thus the processes of this invention in addition to the numerous advantages already pointed out fulfill one of the essential requirements for economic plant scale operation in that the operating and regulating of equipment may be delegated to unskilled labor.

While I have disclosed my invention with particular reference to the preferred process as illustrated in the accompanying drawing, it will be understood that numerous variations in accordance with the principles already outlined may be made without departing from the spirit of the invention. Thus the processes of this invention are adapted for use in systems differing widely in their specific nature and in the type of apparatus employed. The only criteria required insofar as the apparatus is concerned is that the cooling tower be of sufficient capacity to effect the desired concentration of the cooling medium with respect to sulphuric acid.

While it is preferable to operate under conditions such that the cooling acid effluent is discharged sufficiently concentrated with respect to sulphuric acid to preclude any substantial amount of hydrochloric acid from remaining dissolved in and being discharged with the effluent, my invention in its broader aspect is in no wise limited thereto but includes within its broader scope operation under conditions such that the major portion of the sensible heat of the furnace gas over and above that dissipated by radiation is converted into sensible heat of vaporization of water.

In normal operation and with suitably designed equipment operation under these conditions will inherently result in concentration of the cooling medium with respect to sulphuric acid to the degree required to preclude any substantial amount of hydrochloric acid from remaining dissolved therein. The fact that under certain conditions, however, whether due to inadequate apparatus or inefficient operation, such high degree of concentration may not be obtained, is not to be construed as avoiding the processes of this invention where the operations in other respects embody the broad concept as above stated.

In the process, as illustrated in the accompanying drawing, it will be sufficient to operate under such conditions that the tower effluent is at least as concentrated with respect to sulphuric acid as the filter acid. When these conditions obtain, loss of hydrochloric acid in the cooling tower will be precluded because the quantity of hydrochloric acid in the effluent acid will be smaller than the quantity of hydrochloric acid in the filter acid. This follows from the fact that under these conditions the two acids are in equilibrium, have substantially the same volume, and are at approximately the same temperature. If anything, the temperature of the effluent acid is somewhat higher than the coke box acid which, coupled with the scrubbing action of the furnace gas, insures that the effluent acid contains less hydrochloric acid than the filter acid. A higher degree of concentration, however, is preferred in order more fully to utilize the capacity of the cooling tower to strip hydrochloric acid from the filter acid. Preferably, the concentration is carried out at such degree that the effluent acid contains less than 3 per cent of hydrochloric acid as under these conditions the furnace gas passes on to the absorption unit without any appreciable diminution, less than 0.10 per cent, in its hydrochloric acid content.

While I have disclosed that wide variations may be observed in the inlet and outlet temperatures A and B, I prefer to operate with the inlet temperature A not substantially greater than 500° F. and not substantially less than 400° F., and to maintain the outlet temperature B somewhat less than the maximum permissible temperature, preferably about 155° F. to 175° F. Under these conditions I obtain maximum permissible dissipation of heat by radiation yet retain sufficient of the sensible heat of the furnace gas for efficient stripping of the hydrochloric acid from the filter acid.

Numerous variations, including those mentioned above, may be made without departing from the spirit of my invention as long as the furnace gas prior to filtering is contacted with an aqueous medium under such conditions that a major portion of the sensible heat of the furnace gas over and above that dissipated by radiation is transferred to heat of vaporization of water, and preferably under such conditions that the effluent acid is concentrated with respect to sulphuric acid sufficiently to preclude any substantial amount of hydrochloric acid from remaining dissolved therein.

I claim:

1. In a process for removing sulphuric acid from hydrochloric acid-containing gas which comprises cooling the gas to a temperature sufficient to form sulphuric acid mist and passing the cooled gas thru a filter in which an aqueous mixture of sulphuric and hydrochloric acids is produced, that improvement in cooling the gas which comprises contacting the gas with an aqueous medium comprising filter acid for a time sufficient that a substantial portion of the sensible heat of the gas is converted to latent heat of vaporization of water and that the aqueous medium is concentrated with respect to sulphuric acid sufficiently to preclude any substantial quantity of hydrochloric acid from remaining dissolved therein.

2. In a process for removing sulphuric acid from gas containing hydrochloric acid wherein the gas is cooled prior to filtering sufficiently to form sulphuric acid mist and in which part of the cooling is obtained by passing the gas thru a cooling tower prior to the introduction of the cooled gas into a filter unit, that improvement in the method of cooling the gas which comprises withdrawing filter acid from the filter unit, diluting the filter acid with an aqueous medium, and passing the diluted filter acid thru the cooling tower at a rate such that sufficient water is evaporated from said aqueous medium to make the tower effluent at least as concentrated with respect to sulphuric acid as the filter acid.

3. In a process for removing sulphuric acid from gas containing hydrochloric acid wherein the gas is cooled prior to filtering sufficiently to form sulphuric acid mist and in which part of the cooling is obtained by passing the gas thru a cooling tower prior to the introduction of the cooled gas into a filter unit, that improvement in the method of cooling the gas which comprises withdrawing filter acid from the filter unit, diluting the filter acid with an aqueous medium, and passing the diluted filter acid thru the cooling tower at a rate such that sufficient water is evaporated from said aqueous medium to make the tower effluent concentrated with respect to sulphuric acid sufficiently to preclude any substantial quantity of hydrochloric acid from remaining dissolved therein.

4. The method of removing sulphuric acid from hot hydrochloric acid-containing gas which comprises cooling the hot gas in the presence of water sufficiently that acid mist containing hydrochloric acid and sulphuric acid is formed, condensing said mist, separating the condensed mist from the gas, concentrating said condensed mist by heat exchange with said hot hydrochloric acid-containing gas, and introducing the thereby evolved hydrochloric acid gas and water vapor into the hydrochloric acid-containing gas prior to said separation.

5. In a process for the manufacture of hydrochloric acid from sulphuric acid wherein furnace gas is led successively thru the cooling tower and a filter for the removal of sulphuric acid in which an aqueous mixture of sulphuric and hydrochloric acids is produced, the method of recovering the hydrochloric acid content of the filter acid which comprises contacting the furnace gas within said cooling tower with a scrubbing medium comprising the filter acid and so adjusting the sulphuric acid concentration of the scrubbing medium that the hydrochloric acid contained in the filter acid is evolved within the tower and thereby reintroduced into the furnace gas.

OTHO L. THOMAS.